(12) United States Patent
Hiasa et al.

(10) Patent No.: US 11,742,522 B2
(45) Date of Patent: Aug. 29, 2023

(54) NON-AQUEOUS ELECTROLYTIC SOLUTION AND NON-AQUEOUS ELECTROLYTE SECONDARY BATTERY

(71) Applicant: MURATA MANUFACTURING CO., LTD., Kyoto (JP)

(72) Inventors: Takumi Hiasa, Kyoto (JP); Kazunari Motohashi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 254 days.

(21) Appl. No.: 17/356,803

(22) Filed: Jun. 24, 2021

(65) Prior Publication Data

US 2021/0320333 A1 Oct. 14, 2021

Related U.S. Application Data

(63) Continuation of application No. PCT/JP2019/051195, filed on Dec. 26, 2019.

(30) Foreign Application Priority Data

Dec. 27, 2018 (JP) .................................. 2018-245800

(51) Int. Cl.
*H01M 10/0567* (2010.01)
*H01M 10/0569* (2010.01)
*H01M 10/0525* (2010.01)

(52) U.S. Cl.
CPC .... *H01M 10/0567* (2013.01); *H01M 10/0525* (2013.01); *H01M 10/0569* (2013.01); *H01M 2300/0028* (2013.01)

(58) Field of Classification Search
None
See application file for complete search history.

(56) References Cited

U.S. PATENT DOCUMENTS

2012/0171581 A1 7/2012 Abe et al.
2018/0191031 A1* 7/2018 Yu .................... H01M 10/0567

FOREIGN PATENT DOCUMENTS

WO 2011034067 A1 3/2011
WO 2015088051 A1 6/2015

OTHER PUBLICATIONS

International Search Report for Application No. PCT/JP2019/051195, dated Feb. 18, 2020.

* cited by examiner

*Primary Examiner* — Carlos Barcena
(74) *Attorney, Agent, or Firm* — K&L Gates LLP (57) ABSTRACT

A non-aqueous electrolyte secondary battery includes a positive electrode, a negative electrode, and a non-aqueous electrolytic solution including a predetermined cyano ester compound and a cyclic sulfuric acid ester.

15 Claims, 3 Drawing Sheets

NON-AQUEOUS ELECTROLYTIC SOLUTION AND NON-AQUEOUS ELECTROLYTE SECONDARY BATTERY

CROSS REFERENCE TO RELATED APPLICATIONS

The present application is a continuation of PCT patent application no. PCT/JP2019/051195, filed on Dec. 26, 2019, which claims priority to Japanese patent application no. JP2018-245800 filed on Dec. 27, 2018, the entire contents of which are being incorporated herein by reference.

BACKGROUND

The present technology generally relates to a non-aqueous electrolytic solution and a non-aqueous electrolyte secondary battery.

Non-aqueous electrolyte secondary batteries are widely used as power sources for electronic devices, electric vehicles and the like because of their light weight and high energy density. The characteristics of non-aqueous electrolyte secondary batteries are greatly affected by the non-aqueous electrolytic solution used, and thus various additives to be added to the non-aqueous electrolytic solution have been proposed.

SUMMARY

The present technology generally relates to a non-aqueous electrolytic solution and a non-aqueous electrolyte secondary battery.

The non-aqueous electrolytic solutions containing cyano ester compounds can suppress a decrease in capacity of non-aqueous electrolyte secondary batteries during storage but deteriorate the cycle characteristics of non-aqueous electrolyte secondary batteries because of the reaction of the cyano ester compounds.

An object of the present technology is to provide a non-aqueous electrolytic solution and a non-aqueous electrolyte secondary battery which are capable of suppressing a decrease in capacity during storage and deterioration in cycle characteristics.

According to an embodiment of the present technology, a non-aqueous electrolytic solution is provided. The non-aqueous electrolytic solution includes a compound represented by following Formula (1) and a cyclic sulfuric acid ester.

(1)

(In formula (1), m is an integer from 0 to 10, and $R_1$, $R_2$, $R_3$, $R_4$, and $R_5$ each independently represent a hydrocarbon group, halogen group, or hydrogen group that may have a substituent. two or more $R_4$ may be same as or different from one another and two or more $R_5$ may be same as or different from one another when m is two or more.)

According to an embodiment of the present technology, a non-aqueous electrolyte secondary battery is provided. The non-aqueous electrolyte secondary battery includes a positive electrode, a negative electrode, and the non-aqueous electrolytic solution according to the embodiments as described herein.

According to the present technology, it is possible to suppress a decrease in capacity during storage and deterioration in cycle characteristics of a non-aqueous electrolyte secondary battery.

It should be understood that the effects described in the present specification are only examples, which do not impose limitations, and additional effects may be further provided.

DETAILED DESCRIPTION

As described herein, the present disclosure will be described based on examples with reference to the drawings, but the present disclosure is not to be considered limited to the examples, and various numerical values and materials in the examples are considered by way of example.

In the present, specification, the numerical range indicated by using "to" indicates a range including the numerical values before and after "to" as the minimum value and the maximum value, respectively. In the numerical range described stepwise in the present specification, the upper limit value or lower limit value of the numerical range of one step may be replaced with the upper limit value or lower limit value of the numerical range of another step. Unless otherwise stated, the materials exemplified in the present specification may be used singly or in combination of two or more thereof.

The electrolytic solution according to the first embodiment of the present technology is a so-called non-aqueous electrolytic solution and contains an organic solvent (non-aqueous solvent), an electrolyte salt, a first additive, and a second additive. This electrolytic solution is suitable for use in a non-aqueous electrolyte secondary battery (hereinafter, simply referred to as "battery") such as a lithium ion secondary battery.

As the organic solvent, cyclic carbonic acid esters such as ethylene carbonate, propylene carbonate, and butylene carbonate can be used, and it is preferable to use either of ethylene carbonate or propylene carbonate, particularly both of these in mixture. This is because cycle characteristics can be further improved.

As the organic solvent, it is preferable to use chain carbonic acid esters such as diethyl carbonate, dimethyl carbonate, ethyl methyl carbonate, or methyl propyl carbonate in mixture in addition to these cyclic carbonic acid esters. This is because high ionic conductivity can be attained.

In addition to these, for example, at least one selected from the group consisting of chain carboxylic acid esters such as ethyl acetate, ethyl propionate, propyl propionate, methyl butyrate, methyl isobutyrate, and methyl trimethylacetate, lactones such as γ-butyrolactone and γ-valerolactone, ethers such as 1,2-dimethoxyethane, tetrahydrofuran,

2-methyltetrahydrofuran, 1,3-dioxolane, and 4-methyl-1,3-dioxolane, nitrile compounds such as acetonitrile, glutaronitrile, adiponitrile, methoxyacetonitrile, and 3-methoxypyronitrile, N,N-dimethylformamide, N-methylpyrrolidinone, N-methyloxazolidinone, N,N-dimethylimidazolidinone, nitromethane, nitroethane, sulfolane, dimethylsulfoxide, and trimethyl phosphate can be used as the organic solvent.

As the organic solvent, halogenated carbonic acid esters such as 4-fluoro-1,3-dioxolan-2-one, unsaturated cyclic carbonic acid esters such as vinylene carbonate, sulfonic acid esters such as 1,3-propen sultone, acid anhydrides such as carboxylic acid anhydrides, disulfonic acid anhydrides, and carboxylic acid sulfonic acid anhydrides, phosphoric acid esters such as trimethyl phosphate can be further contained. For example, vinyl ene carbonate can further improve the cycle characteristics.

A compound in which at least some of hydrogen atoms in these organic solvents are substituted with fluorine atoms may be preferable since this compound may be able to improve the reversibility of the electrode reaction depending on the kind of electrodes to be combined.

Examples of the electrolyte salt include a lithium salt, and one may be used singly or two or more may be used in mixture. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, lithium difluoro[oxolato-O,O']borate, lithium bisoxalate borate, or LiBr. Among these, $LiPF_6$ is preferable since high ionic conductivity can be attained and cycle characteristics can be further improved.

The first additive is a compound represented by the following Formula (1). As the electrolytic solution contains the first additive, it is possible to suppress a decrease in capacity during storage.

(1)

(In formula (1), m is an integer of 0 or more and 10 or less, and $R_1$, $R_2$, $R_3$, $R_4$, and $R_5$ are each independently a hydrocarbon group, halogen group, or hydrogen group that may have a substituent. Provided that two or more $R_4$ may be same as or different from one another and two or more $R_5$ may be same as or different from one another when m is two or more.)

M in Formula (1) is preferably an integer of 1 or more and 6 or less, more preferably an integer of 3 or more and 6 or less. When m in Formula (1) is 1 or more and 6 or less, it is possible to suppress particularly a decrease in capacity during storage and deterioration in cycle characteristics.

In Formula (1), the hydrocarbon group is a general term for groups composed of carbon (C) and hydrogen (H) and may be a saturated hydrocarbon group or an unsaturated hydrocarbon group. Here, a saturated hydrocarbon group is an aliphatic hydrocarbon group which does not have a carbon-carbon multiple bond and an unsaturated hydrocarbon group is an aliphatic hydrocarbon group having a carbon-carbon multiple bond (carbon-carbon double bond or carbon-carbon triple bond). The hydrocarbon group may be linear, branched with one or two or more side chains, or cyclic with one or two or more rings but is preferably linear since the chemical stability of the electrolytic solution is further improved.

Examples of the substituent that the hydrocarbon group may have include a halogen group and an alkyl group having a halogen group.

When Formula (1) has a hydrocarbon group, the number of carbon atoms belonging to the hydrocarbon group is preferably 1 or more and 5 or less, more preferably 1 or more and 3 or less.

When Formula (1) has a halogen group, the halogen group is, for example, a fluorine group (—F), a chlorine group (—Cl), a bromine group (—Br), or an iodine group (—I) and is preferably a fluorine group (—F).

It is preferable that R2, R3, R4, and R5 in Formula (1) are a hydrogen group since the chemical stability of the electrolytic solution is further improved.

The content of the first additive in the electrolytic solution is preferably 0.01% by mass or more and 10% by mass or less, more preferably 1% by mass or more and 3% by mass or less. When the content of the first additive is 0.01% by mass or more, the function of the first additive can be effectively exerted. Hence, it is possible to further suppress a decrease in capacity during storage of the battery. Meanwhile, when the content of the first, additive is 10% by mass or less, it is possible to suppress the deterioration in battery characteristics due to the excessive reaction of the first additive.

The content of the first additive is determined as follows. First, the battery is disassembled in an inert atmosphere such as a glove box, and the components of electrolytic solution are extracted using a solvent such as dimethyl carbonate (DMC). Next, the content of the first additive in the electrolytic solution is determined by subjecting the obtained extract to GC-MS (Gas Chromatograph-Mass Spectrometry) measurement.

Specific examples of the first additive include at least one selected from the group consisting of compounds represented by the following Formulas (1-1) to (1-4). Hereinafter, the compounds represented by Formulas (1-1) to (1-4) are referred to as compounds (1-1) to (1-4), respectively.

(1-1)

(1-2)

(1-3)

(1-4)

The second additive is a cyclic sulfuric acid ester. When the electrolytic solution contains the first additive alone as the additive, the cycle characteristics tend to decrease by the reaction of the first additive. As the electrolytic solution contains the second additive together with the first additive, it is possible to suppress deterioration in cycle characteristics due to the reaction of the first additive.

The cyclic sulfuric acid ester is represented by, for example, the following Formula (2).

(2)

(In formula (2), n is an integer of 0 or more and 2 or less, and $R_6$, $R_7$, $R_8$, $R_9$, $R_{10}$, and $R_{11}$ are each independently a hydrocarbon group, halogen group, or hydrogen group that may have a substituent. Provided that two or more $R_8$ may be the same as or different from one another and two or more $R_9$ may be the same as or different from one another when n is two or more.)

It is preferable that n in Formula (2) is 0. When n is 0, it is possible to suppress particularly a decrease in capacity during storage and deterioration in cycle characteristics. Among the compounds in which n in Formula (2) is 0, ethylene sulfate is particularly preferable since the suppression effect is remarkably exerted.

In Formula (2), the hydrocarbon group is the same as the hydrocarbon group in Formula (1) described above. It is preferable that $R_6$, $R_7$, $R_8$, $R_9$, $R_{10}$, and $R_{11}$ in Formula (2) are a hydrogen group since the chemical stability of the electrolytic solution is further improved.

The content of the second additive in the electrolytic solution is preferably 0.01% by mass or more and 10% by mass or less, more preferably 1% by mass or more and 3% by mass or less. When the content of the second additive is 0.01% by mass or more, the function of the second additive can be effectively exerted. Hence, it is possible to further suppress the deterioration in cycle characteristics. Meanwhile, when the content of the second additive is 10% by mass or less, it is possible to suppress the deterioration in battery characteristics due to the excessive reaction of the second additive.

The content, of the second additive is determined in the same manner as the content of the first additive described above.

Specific examples of the second additive include at least one selected from the group consisting of ethylene sulfate, propylene sulfate, and butylene sulfate.

As described above, the electrolytic solution according to the first embodiment contains the compound represented by Formula (1) as the first additive and the cyclic sulfuric acid ester as the second additive. As the electrolytic solution contains the first additive, it is possible to suppress a decrease in capacity during storage of the battery. As the electrolytic solution contains the second additive, it is possible to suppress deterioration in cycle characteristics of the battery due to the reaction of the first additive. Hence, it is possible to suppress a decrease in capacity during storage and deterioration in cycle characteristics of the battery.

In the second embodiment, a battery including the electrolytic solution according to the first embodiment described above will be described.

Figure 1:
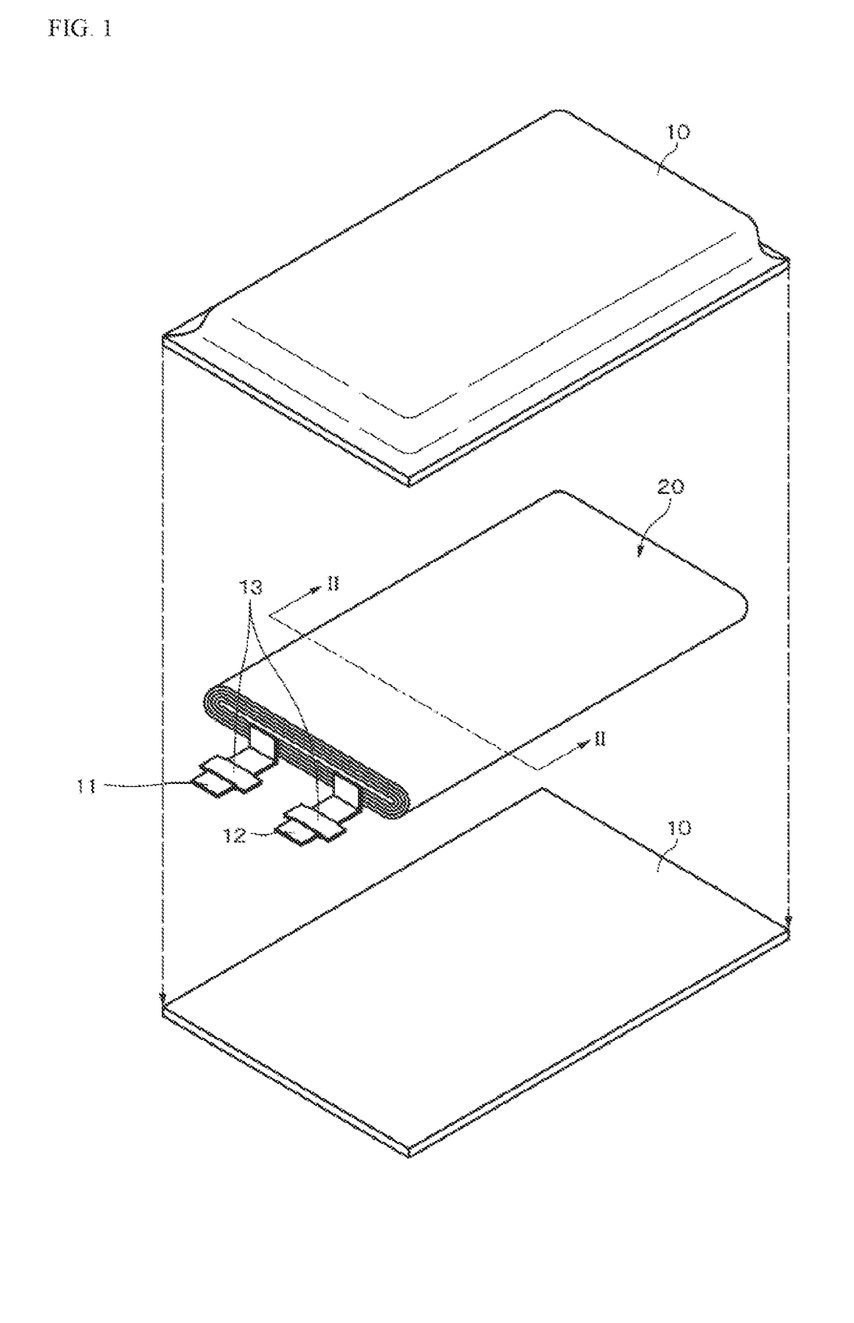
FIG. 1 is an exploded perspective view illustrating an example of the configuration of a non-aqueous electrolyte secondary battery according to an embodiment of the present technology.

FIG. 1 illustrates an example of the configuration of a battery according to the second embodiment of the present technology. The battery is a so-called laminate type battery and includes a wound type electrode body 20 to which a positive electrode lead 11 and a negative electrode lead 12 are attached, an electrolytic solution (not illustrated) as an electrolyte, and a film-like exterior material 10 housing these electrode body 20 and electrolytic solution, and the miniaturization, weight saving, and thinning of the battery are possible.

The positive electrode lead 11 and the negative electrode lead 12 are both led out, for example, in the same direction from the inside to the outside of the exterior material 10. The positive electrode lead 11 and the negative electrode lead 12 are each formed of a metal material such as Al, Cu, Ni, or stainless steel and each have a thin plate shape or a mesh shape.

The exterior material 10 is formed of, for example, a rectangular aluminum laminate film in which a nylon film, an aluminum foil, and a polyethylene film are bonded to each other in this order. The exterior material 10 is arranged so that, for example, the polyethylene film side and the electrode body 20 face each other, and the respective outer edge portions are in close contact with each other by sealing or an adhesive. A close contact film 13 is inserted between the exterior material 10 and the positive electrode lead 11 and between the exterior material 10 and the negative electrode lead 12 in order to prevent intrusion of outside air. The close contact film 13 is formed of a material exhibiting close contact property to the positive electrode lead 11 and the negative electrode lead 12, for example, a polyolefin resin such as polyethylene, polypropylene, modified polyethylene, or modified polypropylene.

The exterior material 10 may be formed of a laminate film having another structure, a polymer film such as polypropylene, or a metal film instead of the above-described aluminum laminate film. Alternatively, the exterior material 10 may be formed of a laminate film in which a polymer film is laminated on one surface or both surfaces of an aluminum film as a core material.

Figure 2:
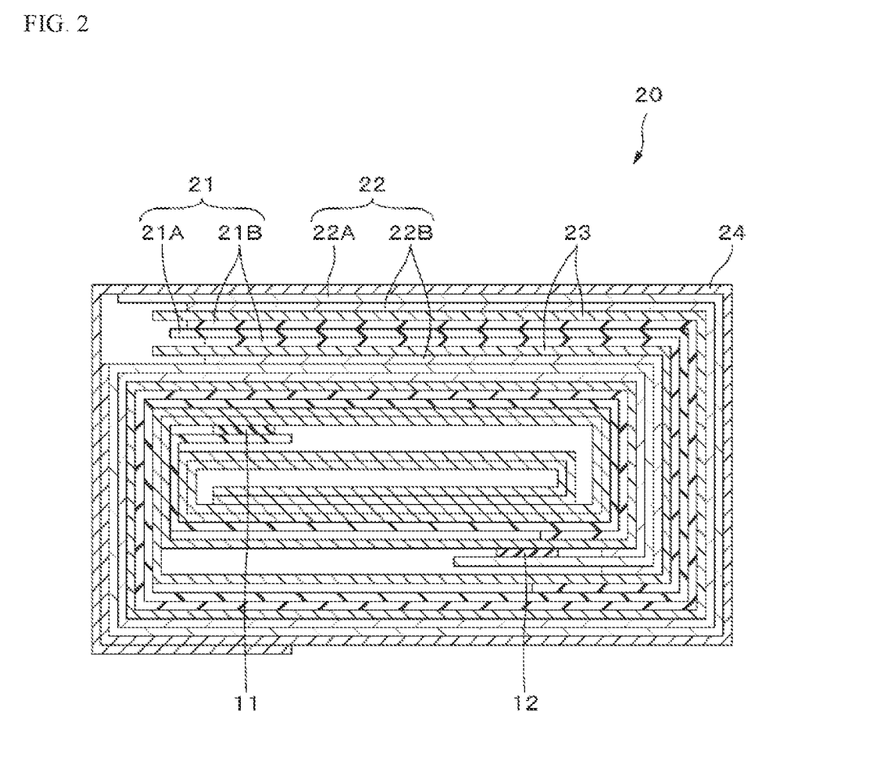
FIG. 2 is a sectional view taken along the line II-II in FIG. 1.

FIG. 2 is a sectional view of the electrode body 20 illustrated in FIG. 1 taken along the line II-II. The electrode body 20 includes a positive electrode 21 having an elongated shape, a negative electrode 22 having an elongated shape, and a separator 23 that is provided between the positive electrode 21 and the negative electrode 22 and has an elongated shape. The electrode body 20 has a configuration in which the positive electrode 21 and the negative electrode 22 are stacked with the separator 23 interposed therebetween and wound in the longitudinal direction so as to be flat and spiral, and the outermost peripheral portion of the electrode body 20 is protected by a protective tape 24. The positive electrode 21, the negative electrode 22, and the separator 23 are impregnated with the electrolytic solution.

Hereinafter, the positive electrode 21, the negative electrode 22, the separator 23, and the electrolytic solution which constitute the battery will be sequentially described.

The positive electrode 21 includes, for example, a positive electrode current collector 21A and a positive electrode active material layer 21B provided on both surfaces of the positive electrode current collector 21A. The positive electrode current collector 21A is formed of, for example, a metal foil such as an aluminum foil, a nickel foil, or a stainless foil. The positive electrode active material layer 21B contains one or two or more positive electrode active materials capable of storing and releasing lithium. The positive electrode active material layer 21B may further contain at least one of a binder or a conductive agent, if necessary.

As the positive electrode active material, for example, a lithium-containing compound such as lithium oxide, lithium phosphorus oxide, lithium sulfide, or an intercalation compound containing lithium is suitable, and two or more of these may be used in mixture. In order to increase the energy density, a lithium-containing compound which contains lithium, a transition metal element, and oxygen is preferable. Examples of such a lithium-containing compound include a lithium composite oxide having a layered rock salt type structure represented by Formula (A) and a lithium composite phosphate having an olivine type structure represented by Formula (B). The lithium-containing compound is more preferably a lithium-containing compound containing at least one selected from the group consisting of Co, Ni, Mn, and Fe as a transition metal element. Examples of such a lithium-containing compound include a lithium composite oxide having a layered rock salt, type structure represented by Formula (C), Formula (D), or Formula (E), a lithium composite oxide having a spinel type structure represented by Formula (F), or a lithium composite phosphate having an olivine type structure represented by Formula (G), and specific examples thereof include $LiNi_{0.50}Co_{0.20}Mn_{0.30}O_2$, $LiCoO_2$, $LiNiO_2$, $LiNi_aCo_{1-a}O_2$ ($0<a<1$), $LiMn_2O_4$, or $LiFePO_4$.

$$Li_pNi_{(1-q-r)}Mn_qM1_rO_{(2-y)}X_z \qquad (A)$$

(In Formula (A), M1 represents at least one selected from the elements belonging to the groups 2 to 15 except Ni and Mn. X represents at least one selected from the group consisting of the elements belonging to the group 16 other than oxygen and the elements belonging to the group 17. p, q, y, and z are values within ranges of $0 \leq p \leq 1.5$, $0 \leq q \leq 1.0$, $0 \leq r \leq 1.0$, $-0.10 \leq y \leq 0.20$, and $0 \leq z \leq 0.2$.)

$$Li_aM2_bPO_4 \qquad (B)$$

(In Formula (B), M2 represents at least one selected from the elements belonging to the groups 2 to 15. a and b are values within ranges of $0 \leq a \leq 2.0$ and $0.5 \leq b \leq 2.0$.)

$$Li_jMn_{(1-g-h)}Ni_gM3_hO_{(2-j)}F_k \qquad (C)$$

(In Formula (C), M3 represents at least one selected from the group consisting of Co, Mg, Al, B, Ti, V, Cr, Fe, Cu, Zn, Zr, Mo, Sn, Ca, Sr, and W. f, g, h, j, and k are values within ranges of $0.8 \leq f \leq 1.2$, $0<g<0.5$, $0 \leq h \leq 0.5$, $g+h<1$, $-0.1 \leq j \leq 0.2$, and $0 \leq k \leq 0.1$. The composition of lithium differs depending on the state of charge and discharge, and the value of f represents a value in the fully discharged state.)

$$Li_mNi_{(1-n)}M4_nO_{(2-p)}F_q \qquad (D)$$

(In Formula (D), M4 represents at least one selected from the group consisting of Co, Mn, Mg, Al, B, Ti, V, Cr, Fe, Cu, Zn, Mo, Sn, Ca, Sr, and W. m, n, p, and q are values within ranges of $0.8 \leq m \leq 1.2$, $0.005 \leq n \leq 0.5$, $-0.1 \leq p \leq 0.2$, and $0 \leq q \leq 0.1$. The composition of lithium differs depending on the state of charge and discharge, and the value of m represents a value in the fully discharged state.)

$$Li_rCo_{(1-s)}M5_sO_{(2-t)}F_u \qquad (E)$$

(In Formula (E), M5 represents at least one selected from the group consisting of Ni, Mn, Mg, Al, B, Ti, V, Cr, Fe, Cu, Zn, Mo, Sn, Ca, Sr, and W. r, s, t, and u are values within ranges of $0.8 \leq r \leq 1.2$, $0 \leq s \leq 0.5$, $-0.1 \leq t \leq 0.2$, and $0 \leq u \leq 0.1$. The composition of lithium differs depending on the state of charge and discharge, and the value of r represents a value in the fully discharged state.)

$$Li_vMn_{2-w}M6_wO_xF_y \qquad (F)$$

(In Formula (F), M6 represents at least one selected from the group consisting of Co, Ni, Mg, Al, B, Ti, V, Cr, Fe, Cu, Zn, Mo, Sn, Ca, Sr, and W. v, w, x, and y are values within ranges of $0.9 \leq v \leq 1.1$, $0 \leq w \leq 0.6$, $3.7 \leq x \leq 4.1$, and $0 \leq y \leq 0.1$. The composition of lithium differs depending on the state of charge and discharge, and the value of v represents a value in the fully discharged state.)

$$Li_zM7PO_4 \qquad (G)$$

(In Formula (G), M7 represents at least one selected from the group consisting of Co, Mg, Fe, Ni, Mg, Al, B, Ti, V, Nb, Cu, Zn, Mo, Ca, Sr, W, and Zr. z is a value within a range of $0.9 \leq z \leq 1.1$. The composition of lithium differs depending on the state of charge and discharge, and the value of z represents a value in the fully discharged state.)

As the positive electrode active material capable of storing and releasing lithium, it is also possible to use inorganic compounds which do not contain lithium such as $MnO_2$, $V_2O_5$, $V_6O_{13}$, NiS, and MoS in addition to these.

The positive electrode active material capable of storing and releasing lithium may be one other than the above. Two or more of the positive electrode active materials exemplified above may be mixed in any combination.

As the binder, for example, at least one selected from the group consisting of polyvinylidene fluoride, polytetrafluoroethyiene, polyacrylonitrile, styrene-butadiene rubber, and carboxymethylcellulose, and a copolymer containing one of these resin materials as a main component can be used.

As the conductive agent, for example, at least one carbon material selected from the group consisting of graphite, carbon fibers, carbon black, acetylene black, Ketjen black, carbon nanotubes, and graphene can be used. The conductive agent may be any material exhibiting conductivity and is not limited to the carbon materials. For example, a metal material or a conductive polymer material may be used as the conductive agent. Examples of the shape of the conductive agent include a granular shape, a scaly shape, a hollow shape, a needle shape, and a tubular shape, but the shape is not limited to these shapes.

The negative electrode 22 includes, for example, a negative electrode current collector 22. A and a negative electrode active material layer 22B provided on both surfaces of the negative electrode current collector 22A. The negative electrode current collector 22A is formed of, for example, a metal foil such as a copper foil, a nickel foil, or a stainless foil. The negative electrode active material layer 22B contains one or two or more negative electrode active materials capable of storing and releasing lithium. The negative electrode active material layer 22B may further contain at least one of a binder or a conductive agent, if necessary.

In this battery, it is preferable that the electrochemical equivalent of the negative electrode 22 or negative electrode active material is greater than the electrochemical equivalent of the positive electrode 21 and lithium metal is not deposited on the negative electrode 22 during charge in theory.

Examples of the negative electrode active material include carbon materials such as non-graphitizable carbon, graphitizable carbon, graphite, pyrolytic carbons, cokes, glassy carbons, organic polymer compound fired bodies, carbon fibers, and activated carbon. Among these, the cokes include pitch coke, needle coke, petroleum coke or the like. The term "organic polymer compound fired bodies" refers to one obtained by firing a polymer material such as phenol resin or furan resin at an appropriate temperature for carbonization, and some organic polymer compound fired bodies are classified as non-graphitizable carbon or graphitizable carbon. These carbon materials are preferable since the change in crystal structure that occurs at the time of charge and discharge is significantly small, a high charge and discharge capacity can be attained, and favorable cycle characteristics can be attained. Particularly, graphite is preferable since graphite has a great electrochemical equivalent and a high energy density can be attained. Non-graphitizable carbon is preferable since excellent cycle characteristics can be attained.

Those having a low charge and discharge potential, specifically those having a charge and discharge potential close to that of lithium metal are preferable since it is possible to easily realize a high energy density of the battery.

Other negative electrode active materials capable of increasing the capacity also include materials containing at least one of a metal element or a metalloid element as a constituent element (for example, an alloy, a compound, or a mixture). This is because a high energy density can be attained when such a material is used. In particular, it is more preferable to use these materials together with the carbon materials since it is possible to attain a high energy density and excellent cycle characteristics. In the present technology, the alloy also includes alloys containing one or more metal elements and one or more metalloid elements in addition to alloys composed of two or more metal elements. The alloy may contain a nonmetallic element. The texture thereof includes a solid solution, a eutectic (eutectic mixture), an intermetallic compound, or coexistence of two or more thereof.

Examples of such a negative electrode active material include a metal element or metalloid element capable of forming an alloy with lithium. Specific examples thereof include Mg, B, Al, Ti, Ga, In, Si, Ge, Sn, Pb, Bi, Cd, Ag, Zn, Hf, Zr, Y, Pd, or Pt. These may be crystalline or amorphous.

Examples of such a negative electrode active material include negative electrode active materials containing metal elements or metalloid elements belonging to the group 4B in the short periodic table as a constituent element, and negative electrode active materials containing at least either of Si or Sn as a constituent, element are preferable among these.

This is because Si and Sn have a great ability to store and release lithium and a high energy density can be attained. Examples of such a negative electrode active material include a simple substance, an alloy, or a compound of Si, and a simple substance, an alloy, or a compound of Sn, and materials having one or two or more of these at least at a part.

Examples of Si alloys include those containing at least one selected from the group consisting of Sn, Ni, Cu, Fe, Co, Mn, Zn, In, Ag, Ti, Ge, Bi, Sb, Nb, Mo, Al, P, Ga, and Cr as the second constituent element other than Si. Examples of Sn alloys include those containing at least one selected from the group consisting of Si, Ni, Cu, Fe, Co, Mn, Zn, In, Ag, Ti, Ge, Bi, Sb, Nb, Mo, Al, P, Ga, and Cr as the second constituent element other than Sn.

Examples of Sn compounds or Si compounds include those containing Q or C as a constituent element. These compounds may contain the above-mentioned second constituent elements.

Among these, the Sn-based negative electrode active material preferably contains Co, Sn, and C as constituent elements and has a low crystalline or amorphous structure.

Examples of other negative electrode active materials also include metal oxides or polymer compounds capable of storing and releasing lithium. Examples of the metal oxides include lithium-titanium oxide containing Li and Ti such as lithium titanate ($Li_4Ti_5O_{12}$), iron oxide, ruthenium oxide, or molybdenum oxide. Examples of the polymer compounds include poly acetylene, polyaniline, or polypyrrole.

As the binder, binders similar to those for the positive electrode active material layer 21B can be used.

As the conductive agent, conductive agents similar to those for the positive electrode active material layer 21B can be used.

The separator 23 separates the positive electrode 21 and the negative electrode 22 from each other, prevents short circuit of current due to the contact between both electrodes, and allows lithium ions to pass through. The separator 23 is formed of, for example, a porous film formed of polytetrafluoroethylene, a polyolefin resin (polypropylene (PP), polyethylene (PE) or the like), an acrylic resin, a styrene resin, a polyester resin, a nylon resin, or a resin obtained by blending these resins and may have a structure in which two or more of these porous films are laminated.

Among these, a polyolefin porous film is preferable since this has an excellent short circuit preventing effect and the safety of the battery can be improved by the shutdown effect. Particularly, polyethylene is preferable as a material forming the separator 23 since polyethylene is also excellent in electrochemical stability and a shutdown effect can be attained in a range of 100° C. or more and 160° C. or less. Among these, low-density polyethylene, high-density polyethylene, and linear polyethylene have proper melting temperatures, are easily procured, and thus are suitably used. In addition, a material obtained by copolymerizing or blending a resin exhibiting chemical stability with polyethylene or polypropylene can be used. Alternatively, the porous film may have a structure composed of three or more layers in which a polypropylene layer, a polyethylene layer, and a polypropylene layer are sequentially laminated. For example, it is desirable to have a three-layer structure of PP/PE/PP and set the mass ratio [wt %] of PP to PE to PP:PE=60:40 to 75:25.

Alternatively, a single-layer substrate formed of 100 wt % PP or 100 wt % PE can be used from the viewpoint of cost. The method for fabricating the separator 23 may be either of a wet method or a dry method.

A nonwoven fabric may be used as the separator 23. As the fibers constituting the nonwoven fabric, aramid fibers, glass fibers, polyolefin fibers, polyethylene terephthalate (PET) fibers, nylon fibers or the like can be used. A nonwoven fabric may be formed by mixing two or more of these fibers.

The separator 23 may have a configuration including a substrate and a surface layer provided on one surface or both surfaces of the substrate. The surface layer contains inorganic grains exhibiting electrical insulation property and a resin material which binds the inorganic grains to the surface of the substrate and the inorganic grains to each other. This resin material may be, for example, fibrillated and have a three-dimensional network structure in which a plurality of fibrils are linked to each other. The inorganic grains are supported on the resin material having this three-dimensional network structure.

The resin material may bind the surface of the substrate and the inorganic grains without being fibrillated. In this case, higher binding property can be attained. By providing the surface layer on one surface or both surfaces of the substrate as described above, the oxidation resistance, heat resistance, and mechanical strength of the separator 23 can be enhanced.

The substrate is a porous film which is permeable to lithium ions and is formed of an insulating film having a predetermined mechanical strength, and it is preferable that the substrate has characteristics to exhibit high resistance to the electrolytic solution, exhibit low reactivity, and hardly expand since the electrolytic solution is retained in the holes of the substrate.

As the material forming the substrate, the resin material or nonwoven fabric forming the above-described separator 23 can be used.

The inorganic grains contain at least one selected from the group consisting of a metal oxide, a metal nitride, a metal carbide, a metal sulfide and the like. As the metal oxide, it is possible to suitably use aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$) or the like. As the metal nitride, it is possible to suitably use silicon nitride ($Si_3N_4$), aluminum nitride (AlN), boron nitride (BN), titanium nitride (TiN) or the like. As the metal carbide, it is possible to suitably use silicon carbide (SiC), boron carbide ($B_4C$) or the like. As the metal sulfide, it is possible to suitably use barium sulfate ($BaSO_4$) or the like. Among the above-mentioned metal oxides, it is preferable to use alumina, titania (particularly those having a rutile type structure), silica, or magnesia and it is more preferable to use alumina.

The inorganic grains may contain minerals such as porous aluminosilicate such as zeolite ($M_{2/n}O \cdot Al_2O_3 \cdot xSiO_2 \cdot yH_2O$, M is a metal element, $x \geq 2$, $v \geq 0$), layered silicate, barium titanate ($BaTiO_3$), or strontium titanate ($SrTiO_3$). The inorganic grains exhibit oxidation resistance and heat resistance, and the surface layer of the positive electrode-facing side surface containing the inorganic grains exhibits strong resistance to the oxidizing environment in the vicinity of the positive electrode at the time of charge. The shape of the inorganic grains is not particularly limited, and any of spherical, plate-like, fibrous, cubic, or random-shaped inorganic grains can be used.

The grain size of the inorganic grains is preferably in a range of 1 nm or more and 10 μm or less. This is because it is difficult to procure the inorganic grains when the grain size is smaller than 1 nm and the distance between the electrodes is electrodes is far, the amount of active material filled in the limited spaces not sufficiently attained, and the battery capacity is low when the grain size is larger than 10 μm.

Examples of the resin material forming the surface layer include resins exhibiting high heat resistance as at least either of the melting point or the glass transition temperature thereof is 180° C. or more such as fluorine-containing resins such as polyvinylidene fluoride and polytetrafluoroethylene, fluorine-containing rubber such as vinylidene fluoride-tetrafluoroethylene copolymer and ethylene-tetrafluoroethylene copolymer, rubbers such as styrene-butadiene copolymer or hydrides thereof, acrylonitrile-butadiene copolymer or hydrides thereof acrylonitrile-butadiene-styrene copolymer or hydrides thereof, methacrylic acid ester-acrylic acid ester copolymer, styrene-acrylic acid ester copolymer, acrylonitrile-acrylic acid ester copolymer, ethylene propylene rubber, polyvinyl alcohol, and polyvinyl acetate, cellulose derivatives such as ethyl cellulose, methyl cellulose, hydroxyethyl cellulose, and carboxymethyl cellulose, polyphenylene ether, polysulfone, polyether sulfone, polyphenylene sulfide, polyetherimide, polyimide, polyamide such as wholly aromatic polyamide (aramid), polyamide-imide, polyacrylonitrile, polyvinyl alcohol, polyether, an acrylic acid resin, or polyester. These resin materials may be used singly or in mixture of two or more thereof. Among these, a fluorine-based resin such as polyvinylidene fluoride is preferable from the viewpoint of oxidation resistance and flexibility and it is preferable to contain aramid or polyamide-imide from the viewpoint of heat resistance.

As the method for forming the surface layer, it is possible to use, for example, a method in which a slurry containing a matrix resin, a solvent, and inorganic grains is applied onto a substrate (porous film) and the applied slurry is allowed to pass through a poor solvent of the matrix resin and a bath of a good solvent of the solvent for phase separation and then dried.

The above-described inorganic grains may be contained in the porous film as a substrate. The surface layer may not contain inorganic grains but may be formed only of a resin material.

As the electrolytic solution, the electrolytic solution according to the first embodiment described above is used. As the electrolyte, an electrolyte layer containing an electrolytic solution and a polymer compound serving as a retainer for retaining this electrolytic solution may be used instead of the electrolytic solution. In this case, the electrolyte layer may be in a gel form.

In a battery having a positive electrode potential (vs $Li/Li^+$) of 4.40 V or more in a fully charged state, the effect by the addition of the first additive and the second additive to the electrolytic solution (namely, the effect of suppressing the decrease in capacity during storage and the deterioration in cycle characteristics) is remarkably exerted. The upper limit value of the positive electrode potential (vs $Li/Li^+$) in the fully charged state is preferably 5.00 V or less, more preferably 4.70 V or less from the viewpoint of suppressing the deterioration in battery characteristics.

In the battery having the above-described configuration, when charge is performed, for example, lithium ions are released from the positive electrode active material layer 21B and stored in the negative electrode active material layer 22B via the electrolytic solution. When discharge is performed, for example, lithium ions are released from the negative electrode active material layer 22B and stored in the positive electrode active material layer 21B via the electrolytic solution.

Next, an example of the method for manufacturing the battery according to the second embodiment of the present technology will be described.

The positive electrode 21 is fabricated as follows. First, for example, a positive electrode active material, a binder, and a conductive agent are mixed together to prepare a positive electrode mixture, and this positive electrode mixture is dispersed in a solvent such as N-methyl-2-pyrrolidone (NMP) to prepare a paste-like positive electrode mixture slurry. Next, this positive electrode mixture slurry is applied to both surfaces of the positive electrode current collector 21A, the solvent is dried, compression molding is performed using a roll pressing machine or the like to form the positive electrode active material layer 21B, and the positive electrode 21 is thus obtained.

The negative electrode 22 is fabricated as follows. First, for example, a negative electrode active material and a binder are mixed together to prepare a negative electrode mixture, and this negative electrode mixture is dispersed in a solvent such as N-methyl-2-pyrrolidone to prepare a paste-like negative electrode mixture slurry. Next, this negative electrode mixture slurry is applied to both surfaces of the negative electrode current collector 22A, the solvent is dried, compression molding is performed using a roll pressing machine or the like to form the negative electrode active material layer 22B, and the negative electrode 22 is thus obtained.

The wound type electrode body 20 is fabricated as follows. First, the positive electrode lead 11 is attached to one end portion of the positive electrode current collector 21A by welding and the negative electrode lead 12 is attached to one end portion of the negative electrode current collector 22A by welding. Next the positive electrode 21 and the negative electrode 22 are wound around the flat core with the separator 23 interposed therebetween and are wound a number of times in the longitudinal direction, and the protective tape 24 is pasted to the outermost peripheral portion of the wound body to obtain the electrode body 20.

The electrode body 20 is sealed with the exterior material 10 as follows. First, the electrode body 20 is sandwiched between the exterior materials 10, the outer peripheral edge portions excluding that of one side are heat-sealed to form a bag shape, and the electrode body 20 is thus housed inside the exterior material 10. At that time, the close contact film 13 is inserted between the positive electrode lead 11 and the exterior material 10 and between the negative electrode lead 12 and the exterior material 10. The close contact film 13 may be attached to each of the positive electrode lead 11 and the negative electrode lead 12 in advance.

Next, the electrolytic solution is injected into the exterior material 10 through the unfused one side, and then the unfused one side is heat-sealed in a vacuum atmosphere for hermetic seal. The battery illustrated in FIG. 1 is thus obtained.

As described above, the battery according to the second embodiment includes the electrolytic solution according to the first embodiment, and it is thus possible to suppress a decrease in capacity during storage and deterioration in cycle characteristics.

In the third embodiment, an electronic device including the battery according to the second embodiment described above will be described.

Figure 3:
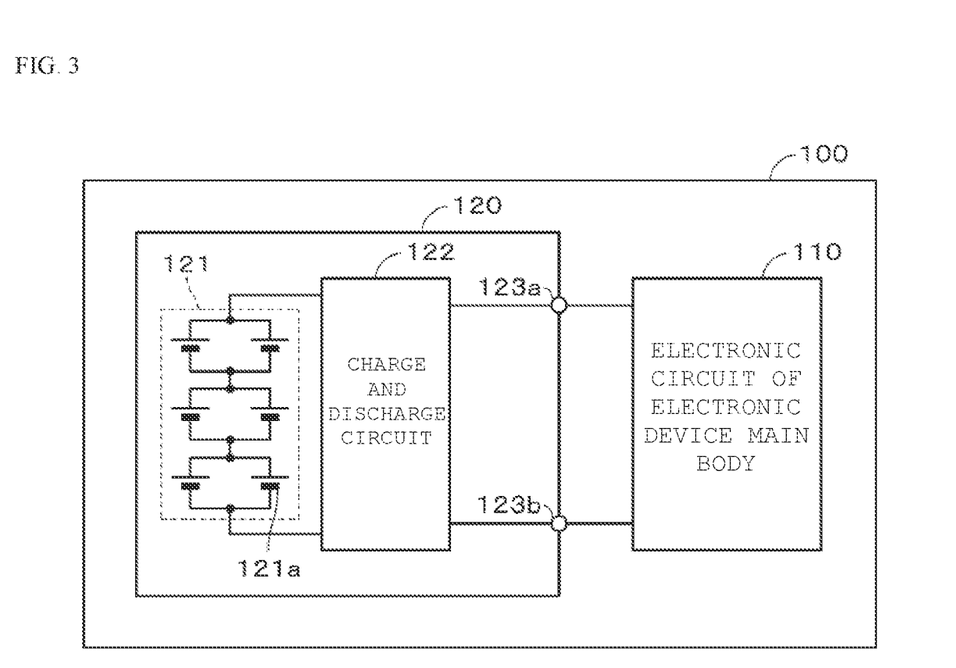
FIG. 3 is a block diagram illustrating an example of the configuration of an electronic device according to an embodiment of the present technology.

FIG. 3 illustrates an example of the configuration of an electronic device 100 according to the third embodiment of the present technology. The electronic device 100 includes an electronic circuit 110 of the electronic device main body and a battery pack 120. The battery pack 120 is electrically connected to the electronic circuit 110 via a positive electrode terminal 123a and a negative electrode terminal 123b The electronic device 100 has, for example, a configuration in which the battery pack 120 is freely attached and detached.

Examples of the electronic device 100 include laptop personal computers, tablet computers, mobile phones (for example, smartphones), personal digital assistants (PDA), display devices (liquid crystal display (LCD), electro luminescence (EL) display, electronic paper and the like), imaging devices (for example, digital still cameras, digital video cameras and the like), audio devices (for example, portable audio players), game consoles, cordless phones, electronic books, electronic dictionaries, radios, headphones, navigation systems, memory cards, pacemakers, hearing aids, electric power tools, electric shavers, refrigerators, air conditioners, TVs, stereos, water heaters, microwave ovens, dishwashers, washing machines, dryers, lighting equipment, toys, medical equipment, robots, road conditioners, and traffic lights, but the electronic device 100 is not limited thereto.

The electronic circuit 110 includes, for example, a central processing unit (CPU), a peripheral logic unit, an interface unit, and a storage unit and controls the entire electronic device 100.

The battery pack 120 includes an assembled battery 121 and a charge and discharge circuit 122. The battery pack 120 may further include an exterior material (not illustrated) which houses the assembled battery 121 and the charge and discharge circuit 122, if necessary.

The assembled battery 121 is configured by connecting a plurality of secondary batteries 121a in series and/or in parallel. The plurality of secondary batteries 121a are connected, for example, n in parallel×m in series (n and m are positive integers). FIG. 3 illustrates an example in which six secondary batteries 121a are connected two in parallel×three in series (2P3S). As the secondary battery 121a, the battery according to the second embodiment described above is used.

Here, a case in which the battery pack 120 includes the assembled battery 121 composed of the plurality of secondary batteries 121a is described, but a configuration in which the battery pack 120 includes one secondary battery 121a instead of the assembled battery 121 may be adopted.

The charge and discharge circuit 122 is a control unit which controls charge and discharge of the assembled battery 121. Specifically, the charge and discharge circuit 122 controls charge of the assembled battery 121 at the time of charge. On the other hand, the charge and discharge circuit 122 controls discharge of the electronic device 100 at the time of discharge (that is, when the electronic device 100 is used).

As the exterior material, for example, a ease formed of a metal, a polymer resin, or a composite material thereof can be used. Examples of the composite material include a laminated body in which a metal layer and a polymer resin layer are laminated.

EXAMPLES

Hereinafter, the present technology will be specifically described with reference to Examples, but the present technology is not limited only to these Examples.

Example 1

The positive electrode was fabricated as follows. First, a positive electrode mixture was prepared by mixing 91 parts by mass of a positive electrode active material (lithium cobalt oxide ($LiCoO_2$)), 3 parts by mass of a positive electrode binder (polyvinylidene fluoride), and 6 parts by mass of a positive electrode conductive agent (graphite) together. Subsequently, the positive electrode mixture was added to an organic solvent (N-methyl-2-pyrrolidone), and then the organic solvent was stirred to prepare a paste-like positive electrode mixture slurry. Next, the positive electrode mixture slurry was applied to both surfaces of a positive electrode current collector (belt-shaped aluminum foil, thickness: 12 μm) using a coating apparatus and then dried to form a positive electrode active material layer. Finally, the positive electrode active material layer was compression-molded using a roll pressing machine.

The negative electrode was fabricated as follows. First, a negative electrode mixture was prepared by mixing 95 parts by mass of a negative electrode active material (graphite, median diameter D50=20 μm) and 5 parts by mass of a negative electrode binder (polyvinylidene fluoride) together. Subsequently, the negative electrode mixture was added to an organic solvent (N-methyl-2-pyrrolidone), and then the organic solvent was stirred to obtain a paste-like negative electrode mixture slurry. Next, the negative electrode mixture slurry was applied to both surfaces of a negative electrode current collector (belt-shaped copper foil, thickness: 15 μm) using a coating apparatus and then dried to form a negative electrode active material layer. Finally, the negative electrode active material layer was compression-molded using a roll pressing machine.

The electrolytic solution was prepared as follows. First, a mixed solvent was prepared by mixing ethylene carbonate (EC) and propylene carbonate (PC) together at a mass ratio of EC:PC=50:50. Subsequently, an electrolyte salt (lithium hexafluorophosphate ($LiPF_6$)) was dissolved in this mixed solvent so as to have a concentration of 1 mol/kg, whereby an electrolytic solution was prepared. Next the first additive (compound (1-1)) and the second additive (ethylene sulfate) were added to the electrolytic solution, and the electrolytic solution was stirred. At this time, the amounts of the first additive and second additive added were adjusted so that the concentrations of the first additive and second additive in the electrolytic solution were both 1% by mass.

A laminate type battery was fabricated as follows. First, an aluminum positive electrode lead was welded to the positive electrode current collector, and a copper negative electrode lead was welded to the negative electrode current collector. Subsequently, the positive electrode and the negative electrode were stacked with the separator (microporous polyethylene film, thickness: 15 µm) interposed therebetween to obtain a stacked body. Next, the stacked body was wound in the longitudinal direction, and then a protective tape was pasted to the outermost peripheral portion of the stacked body, thereby fabricating a wound type electrode body. Next, an exterior material (outer side: nylon film with thickness of 25 µm/aluminum foil with thickness of 40 µm/polypropylene film with thickness of 30 µm: inner side) was folded so as to sandwich the electrode body, and then the peripheral edge portions of three sides of the exterior material were heat-sealed to each other.

In this case, a close contact film was inserted between the positive electrode lead and the exterior material as well as between the negative electrode lead and the exterior material. Finally, the electrode body was impregnated with the electrolytic solution by injecting the electrolytic solution into the exterior material, and then the peripheral edge portions of the remaining one side of the exterior material were heat-sealed to each other in a reduced pressure environment. The intended laminate film type battery was thus obtained. This battery was designed so that the open circuit voltage (namely, battery voltage) at full charge was 4.45 V by adjusting the amounts of positive electrode active material and negative electrode active material in the positive electrode and negative electrode fabricating steps.

Example 2

A battery was obtained in the same manner as in Example 1 except that the compound (1-4) was used as the first additive in the electrolytic solution preparing step.

Example 3

A battery was obtained in the same manner as in Example 2 except that the amount of the first additive (compound (1-4)) added was adjusted so that the content of the first additive (compound (1-4)) in the electrolytic solution was 2% by mass in the electrolytic solution preparing step.

Example 4

A battery was obtained in the same manner as in Example 3 except that propylene sulfate was used as the second additive in the electrolytic solution preparing step.

Comparative Example 1

A battery was obtained in the same manner as in Example 1 except that succinonitrile (1,2-dicyanoethane) was used as the first additive and diethyl sulfate was used as the second additive in the electrolytic solution preparing step.

Comparative Example 2

A battery was obtained in the same manner as in Example 3 except that 1,3-propane sultone (1,2-oxathiolane 2,2-dioxide) was used as the second additive in the electrolytic solution preparing step.

Comparative Example 3

A battery was obtained in the same manner as in Example 1 except that succinonitrile (1,2-dicyanoethane) was used as the first additive in the electrolytic solution preparing step.

The batteries obtained as described above were subjected to the following evaluation on the capacity retention after 100 cycles and the capacity retention after a float test.

First, the battery was charged and discharged (1 cycle) in a normal temperature environment (temperature: 23° C.) in order to stabilize the state of the battery. At the time of charge, constant current charge was performed at a current of 0.1 C until the voltage reached 4.45 V, and then constant voltage charge was performed at a voltage of 4.45 V until the current reached 0.02 C. At the time of discharge, the battery was discharged at a current of 0.1 C until the voltage reached 3.0 V. "0.1 C" is a current value at which the battery capacity (theoretical capacity) can be fully charged or discharged in 10 hours. "0.02 C" is a current value at which the battery capacity (theoretical capacity) can be fully charged or discharged in 50 hours.

Subsequently, the battery was charged and discharged (1 cycle) in the same environment to measure the discharge capacity in the second cycle. Next, the battery was repeatedly charged and discharged (100 cycles) in the same environment to measure the discharge capacity in the 101th cycle. At the time of charge, constant current charge of the battery was performed at a current of 1 C until the voltage reached 4.45 V, and then constant voltage charge of the battery was performed at a voltage of 4.45 V until the current reached 0.02 C. At the time of discharge, constant current discharge was performed at a current of 1 C until the voltage reached 3.0 V. "1 C" is a current value at which the battery capacity (theoretical capacity) can be fully charged or discharged in 1 hour. Finally, the capacity retention after 100 cycles was calculated by the following equation.

Capacity retention after 100 cycles (%)=(discharge capacity in 101th cycle/discharge capacity in second cycle)×100.

First, the state of the battery was stabilized according to the same procedure as that in the evaluation on the capacity retention after 100 cycles described above. Subsequently, the battery was charged and discharged (1 cycle) in a normal temperature environment (temperature: 23° C.) to measure the discharge capacity in the second cycle (discharge capacity before float test). Next, the battery was charged in a normal temperature environment (temperature: 23° C.). Constant voltage charge of the battery was then performed at a voltage of 4.45 V for 240 hours in a high temperature environment (temperature: 60° C.). Thereafter, the battery was discharged in a normal temperature environment (temperature: 23° C.) and further charged and discharged (1 cycle) in the same environment to measure the discharge capacity of the battery after a 240-hour float test. Finally, the capacity retention after a float test was calculated by the following equation. The charge and discharge conditions were the same as those for the evaluation on the capacity retention after 100 cycles described above.

Capacity retention after float test (%)=(discharge capacity after 240-hour float test/discharge capacity before float test)×100

Table 1 presents the configurations and evaluation results of the batteries in Examples 1 to 4 and Comparative Examples 1 to 3.

In the battery of Example 3 in which an electrolytic solution containing ethylene sulfate as the second additive was used, the effect of suppressing the deterioration in cycle characteristics and float characteristics is higher as compared with the battery of Example 4 in which an electrolytic solution containing propylene sulfate as the second additive was used.

The embodiments and Examples of the present technology have been specifically described above, but the present technology is not limited to the above-described embodi-

TABLE 1

|  | Solvent Kind | First additive | | Second additive | | Evaluation | |
|---|---|---|---|---|---|---|---|
|  |  | Kind | Content [mass %] | Kind | Content [mass %] | Capacity retention after 100 cycles [%] | Capacity retention after 240-hour float test [%] |
| Example 1 | EC/PC | Compound (1-1) | 1 | Ethylene sulfate | 1 | 90 | 70 |
| Example 2 | EC/PC | Compound (1-4) | 1 | Ethylene sulfate | 1 | 93 | 72 |
| Example 3 | EC/PC | Compound (1-4) | 2 | Ethylene sulfate | 1 | 92 | 72 |
| Example 4 | EC/PC | Compound (1-4) | 2 | Propylene sulfate | 1 | 89 | 70 |
| Comparative Example 1 | EC/PC | Succinonitrile | 1 | Diethyl sulfate | 1 | 72 | 42 |
| Comparative Example 2 | EC/PC | Compound (1-4) | 2 | Propane sultone | 1 | 86 | 69 |
| Comparative Example 3 | EC/PC | Succinonitrile | 1 | Ethylene sulfate | 1 | 86 | 66 |

EC: Ethylene carbonate
PC: Propylene carbonate

The following can be seen from Table 1.

In the batteries of Examples 1 to 4 in which an electrolytic solution containing the compound (1-1) or compound (1-4) as the first additive (additive) and ethylene sulfate or propylene sulfate as the second additive (additive) was used, it is possible to suppress deterioration in cycle characteristics and float characteristics.

In the battery of Comparative Example 1 in which an electrolytic solution containing succinonitrile as the first additive and diethyl sulfate as the second additive was used, both the cycle characteristics and the float characteristics deteriorate.

In the battery of Comparative Example 2 in which an electrolytic solution containing the compound (1-4) as the first additive and propane sultone as the second additive was used and the battery of Comparative Example 3 in which an electrolytic solution containing succinonitrile as the first additive and ethylene sulfate as the second additive was used, it is possible to suppress the deterioration in cycle characteristics and float characteristics as compared with that of the battery of Comparative Example 1 but the suppression effect is not as high as that of the batteries of Examples 1 to 4.

In the battery of Example 2 in which an electrolytic solution containing the compound (1-4) as the first additive was used, the effect of suppressing the deterioration in cycle characteristics and float characteristics is higher as compared with, the battery of Example 1 in which an electrolytic solution containing the compound (1-1) as the first additive was used.

ments and Examples, and various modifications can be made based on the technical idea of the present technology.

For example, the configurations, methods, steps, shapes, materials, numerical values and the like mentioned in the above-described embodiments and Examples are merely examples, and configurations, methods, steps, shapes, materials, numerical values and the like different from these may be used, if necessary.

The configurations, methods, steps, shapes, materials, numerical values and the like of the above-described embodiments and Examples can be combined with each other without departing from the gist of the present technology.

The chemical formulas of compounds and the like exemplified in the above-described embodiments are representative ones, and the valences and the like are not limited to the stated ones as long as the names are general names of the same compounds.

For example, a laminate type battery has been described as an example in the above-described embodiments and Examples, but the shape of the battery is not limited to these, and the present technology can also be applied to various shapes such as a cylindrical shape, a square shape, a coin shape, and a button shape. It is also possible to apply the present technology to a flexible battery to be mounted on wearable terminals such as a smart watch and a head-mounted display and the like.

In the above-described embodiments and Examples, examples in which the present technology is applied to wound type batteries have been described, but the structure of the battery is not limited to these, and the present technology is also applicable to, for example, a stacked type battery in which a positive electrode and a negative electrode are stacked with a separator interposed therebetween, a battery in which a positive electrode and a negative electrode are folded with a separator sandwiched therebetween, and the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A non-aqueous electrolytic solution comprising:
a compound represented by a Formula (1); and
a cyclic sulfuric acid ester:

(1)

wherein m is an integer from 0 to 10, and $R_1$, $R_2$, $R_3$, $R_4$, and $R_5$ each independently represent a hydrocarbon group, halogen group, or hydrogen group.

2. The non-aqueous electrolytic solution according to claim 1, wherein the hydrocarbon group, halogen group, or hydrogen group includes a substituent.

3. The non-aqueous electrolytic solution according to claim 1, wherein two or more $R_4$ are same when m is two or more.

4. The non-aqueous electrolytic solution according to claim 1, wherein two or more $R_4$ are different when m is two or more.

5. The non-aqueous electrolytic solution according to claim 1, wherein two or more $R_5$ are same when m is two or more.

6. The non-aqueous electrolytic solution according to claim 1, wherein two or more $R_5$ are different when m is two or more.

7. The non-aqueous electrolytic solution according to claim 1, wherein m is an integer from 1 to 6.

8. The non-aqueous electrolytic solution according to claim 1, wherein the cyclic sulfuric acid ester is represented by a Formula (2):

(2)

wherein n is an integer from 0 to 2, and $R_6$, $R_7$, $R_8$, $R_9$, $R_{10}$, and $R_{11}$ each independently represent a hydrocarbon group, halogen group, or hydrogen group.

9. The non-aqueous electrolytic solution according to claim 8, wherein two or more $R_8$ are same when n is two or more.

10. The non-aqueous electrolytic solution according to claim 8, wherein two or more $R_8$ are different when n is two or more.

11. The non-aqueous electrolytic solution according to claim 8, wherein two or more $R_9$ are same when n is two or more.

12. The non-aqueous electrolytic solution according to claim 8, wherein two or more $R_9$ are different when n is two or more.

13. The non-aqueous electrolytic solution according to claim 8, wherein n is 0 in Formula (2).

14. The non-aqueous electrolytic solution according to claim 1, wherein the cyclic sulfuric acid ester includes ethylene sulfate.

15. A non-aqueous electrolyte secondary battery comprising:
a positive electrode;
a negative electrode; and
the non-aqueous electrolytic solution according to claim 1.

* * * * *